US012547673B2

United States Patent
Chamarthy et al.

(10) Patent No.: US 12,547,673 B2
(45) Date of Patent: Feb. 10, 2026

(54) CALCULATE FAIRNESS OF MACHINE LEARNING MODEL

(71) Applicant: International Business Machines Corporation, Armonk, NY (US)

(72) Inventors: Ravi Chandra Chamarthy, Hyderabad (IN); Manish Anand Bhide, Hyderabad (IN); Prateek Goyal, Indore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1340 days.

(21) Appl. No.: 17/227,822

(22) Filed: Apr. 12, 2021

(65) Prior Publication Data

US 2022/0327327 A1    Oct. 13, 2022

(51) Int. Cl.
G06N 20/00    (2019.01)
G06F 18/2113    (2023.01)
G06F 18/25    (2023.01)

(52) U.S. Cl.
CPC .......... G06F 18/2113 (2023.01); G06F 18/25 (2023.01); G06N 20/00 (2019.01)

(58) Field of Classification Search
CPC ...... G06F 18/2113; G06F 18/25; G06N 20/00
See application file for complete search history.

(56) References Cited

U.S. PATENT DOCUMENTS

2019/0171897 A1    6/2019    Merai
2020/0034661 A1    1/2020    Kim
2020/0042832 A1    2/2020    Kim
2020/0272853 A1*   8/2020    Zoldi .................... G06F 17/18
2020/0320428 A1   10/2020    Chaloulos
2022/0114399 A1*   4/2022    Castiglione .......... G06V 10/751

OTHER PUBLICATIONS

Hort, Max, Zhenpeng Chen, Jie M. Zhang, Mark Harman, and Federica Sarro. "Bias mitigation for machine learning classifiers: A comprehensive survey." ACM Journal on Responsible Computing 1, No. 2 (2024): 1-52. (Year: 2024).*
Feldman, Michael, Sorelle A. Friedler, John Moeller, Carlos Scheidegger, and Suresh Venkatasubramanian. "Certifying and removing disparate impact." In proceedings of the 21th ACM SIGKDD international conference on knowledge discovery and data mining, pp. 259-268. 2015. (Year: 2015).*

* cited by examiner

Primary Examiner — Casey R. Garner
(74) Attorney, Agent, or Firm — Steven M. Bouknight

(57) ABSTRACT

An approach is provided in which the approach receives scored records that include a selected scored record comprising a first fairness group attribute, a first prediction, and a first confidence value corresponding to the first prediction. The approach perturbs the selected scored record to a second fairness group attribute in response to determining that the first confidence value is below a confidence threshold. The approach scores the perturbed record to generate a second prediction and a second confidence value corresponding to the second prediction. The approach modifies the selected scored record by changing the first prediction to the second prediction in response to determining that the second prediction is different from the first prediction and that the second confidence value is higher than the confidence threshold.

20 Claims, 10 Drawing Sheets

Scored Original Records 330

| FAIRNESS GROUP A: Majority B: Minority | FEATURE VALUES | PREDICTION | PREDICTION CONFIDENCE |
|---|---|---|---|
| A | f1, f2, ... | Favorable | .93 |
| A | f1, f2, ... | Unfavorable | .82 |
| A | f1, f2, ... | Favorable | .45 |
| A | f1, f2, ... | Unfavorable | .42 |
| A | f1, f2, ... | Favorable | .35 |
| A | f1, f2, ... | Unfavorable | .20 |
| B | f1, f2, ... | Favorable | .94 |
| B | f1, f2, ... | Unfavorable | .84 |
| B | f1, f2, ... | Favorable | .48 |
| B | f1, f2, ... | Unfavorable | .45 |
| B | f1, f2, ... | Favorable | .35 |
| B | f1, f2, ... | Unfavorable | .32 |

*FIG. 5*

CALCULATE FAIRNESS OF MACHINE LEARNING MODEL

BACKGROUND

Predictive modeling is a process that uses data and statistics to predict outcomes with data models. Predictive modeling is often referred to as predictive analytics, predictive analysis, and machine learning. Machine learning (ML) is the study of computer algorithms that improve automatically through experience.

Machine learning algorithms build machine learning models based on sample data, known as "training data," to make predictions or decisions without being explicitly programmed. The process of training a machine learning model involves providing a machine learning algorithm with the training data from which to learn, and the artifact created from the training process is the machine learning model. The training data includes correct answers that are referred to as targets or target attributes, and the machine learning algorithm finds patterns in the training data that map input data attributes to the target attributes and outputs a machine learning model that captures the patterns.

Due to the fact that machine learning models are generated from training data, machine learning models may include a data bias that is based on its training data. Several approaches are available to measure the data bias of a machine learning model. One approach is computing a disparate impact ratio that is based on scored record results. The disparate impact ratio is the percent of favorable outcomes in a minority group divided by the percent of favorable outcomes in a majority group.

BRIEF SUMMARY

According to one embodiment of the present disclosure, an approach is provided in which the approach receives scored records that include a selected scored record comprising a first fairness group attribute, a first prediction, and a first confidence value corresponding to the first prediction. The approach perturbs the selected scored record to a second fairness group attribute in response to determining that the first confidence value is below a confidence threshold. The approach scores the perturbed record to generate a second prediction and a second confidence value corresponding to the second prediction. The approach modifies the selected scored record by changing the first prediction to the second prediction in response to determining that the second prediction is different from the first prediction and that the second confidence value is higher than the confidence threshold.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram depicting a list of scored original records;

DETAILED DESCRIPTION

Figure 1:
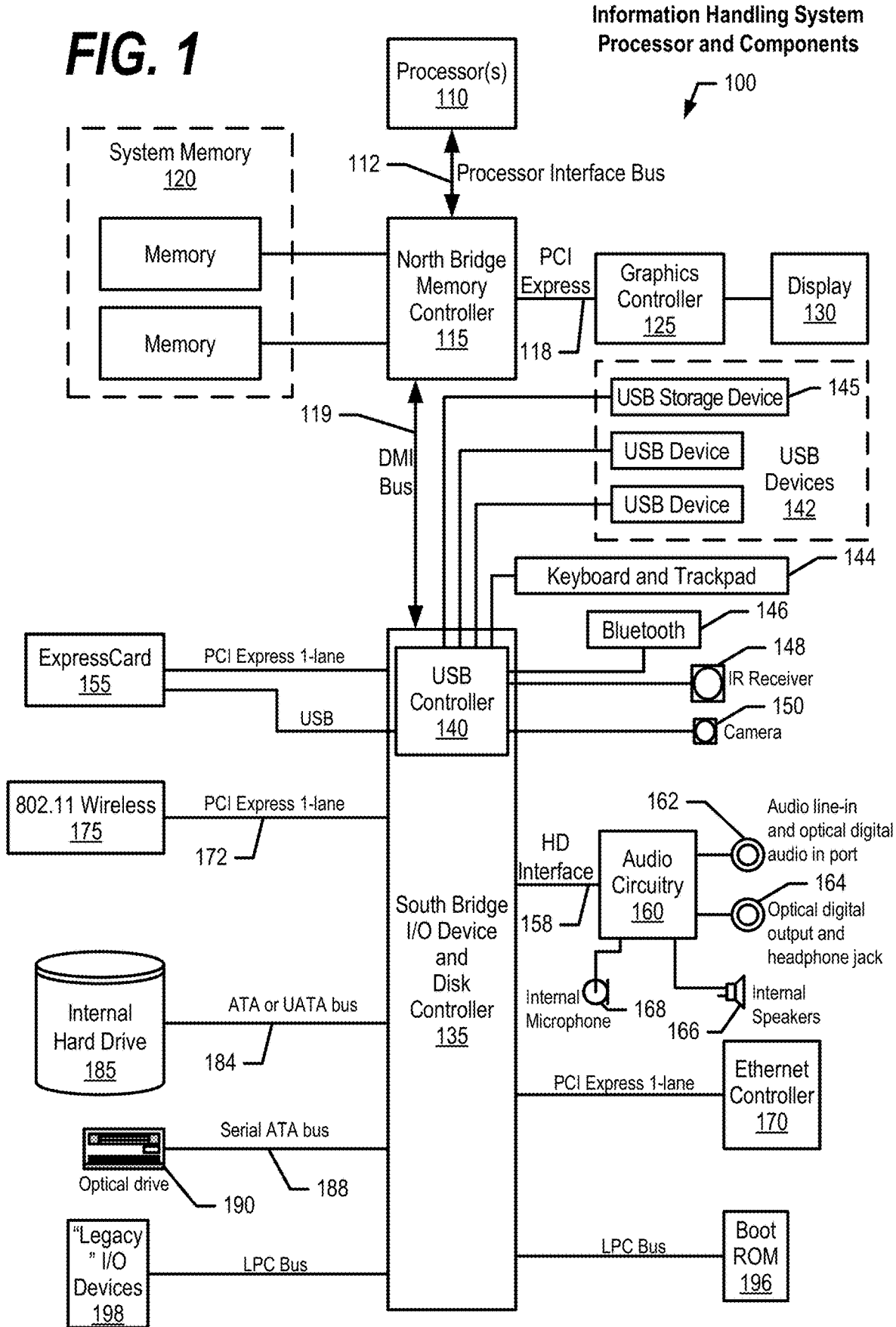
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail value of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
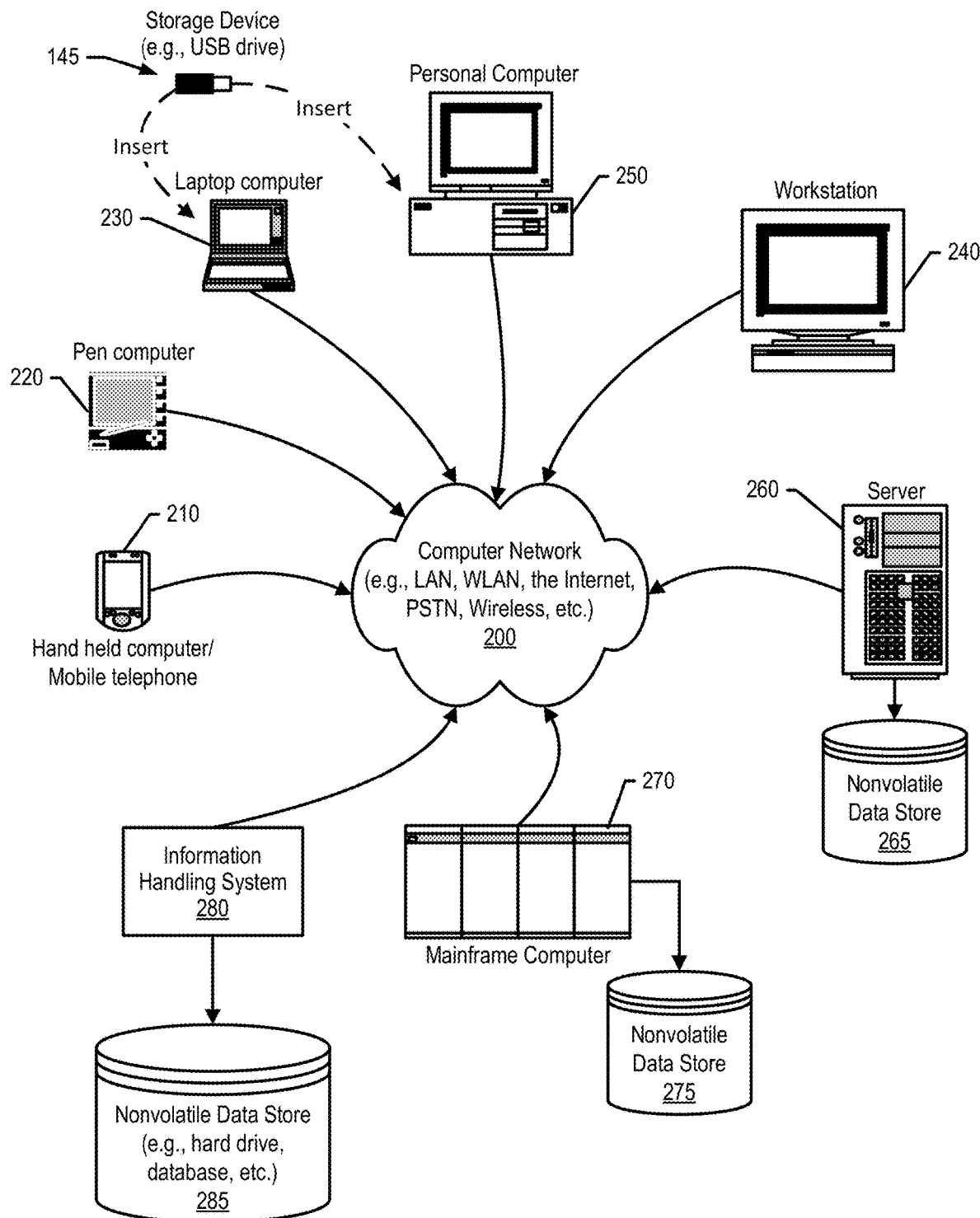
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, one of today's approaches to compute a machine learning model's data bias is to compute its disparate impact ratio. A challenge found with this approach, however, is that the disparate impact ratio does not take into consideration confidence values of scored record predictions. For example, a scored record with a 40% confidence is treated the same as a scored record with 90% confidence. As such, the disparate impact ratio may use inaccurate results from scored records to compute a machine learning model's overall data bias.

FIGS. 3 through 10 depict an approach that can be executed on an information handling system that identifies and evaluates low confidence prediction records and adjusts their prediction outcomes accordingly. Low confidence prediction records are scored original records having a confidence value below a confidence threshold (e.g., 50%). The approach perturbs the low confidence prediction records into a different fairness group (e.g., majority→minority, minority→majority) and has the machine learning model re-score the perturbed records to generate perturbed scores. The approach then changes the prediction of the original record when the perturbed score generates a confidence value above the confidence threshold and also includes a different prediction from the prediction included in the original record.

Figure 3:
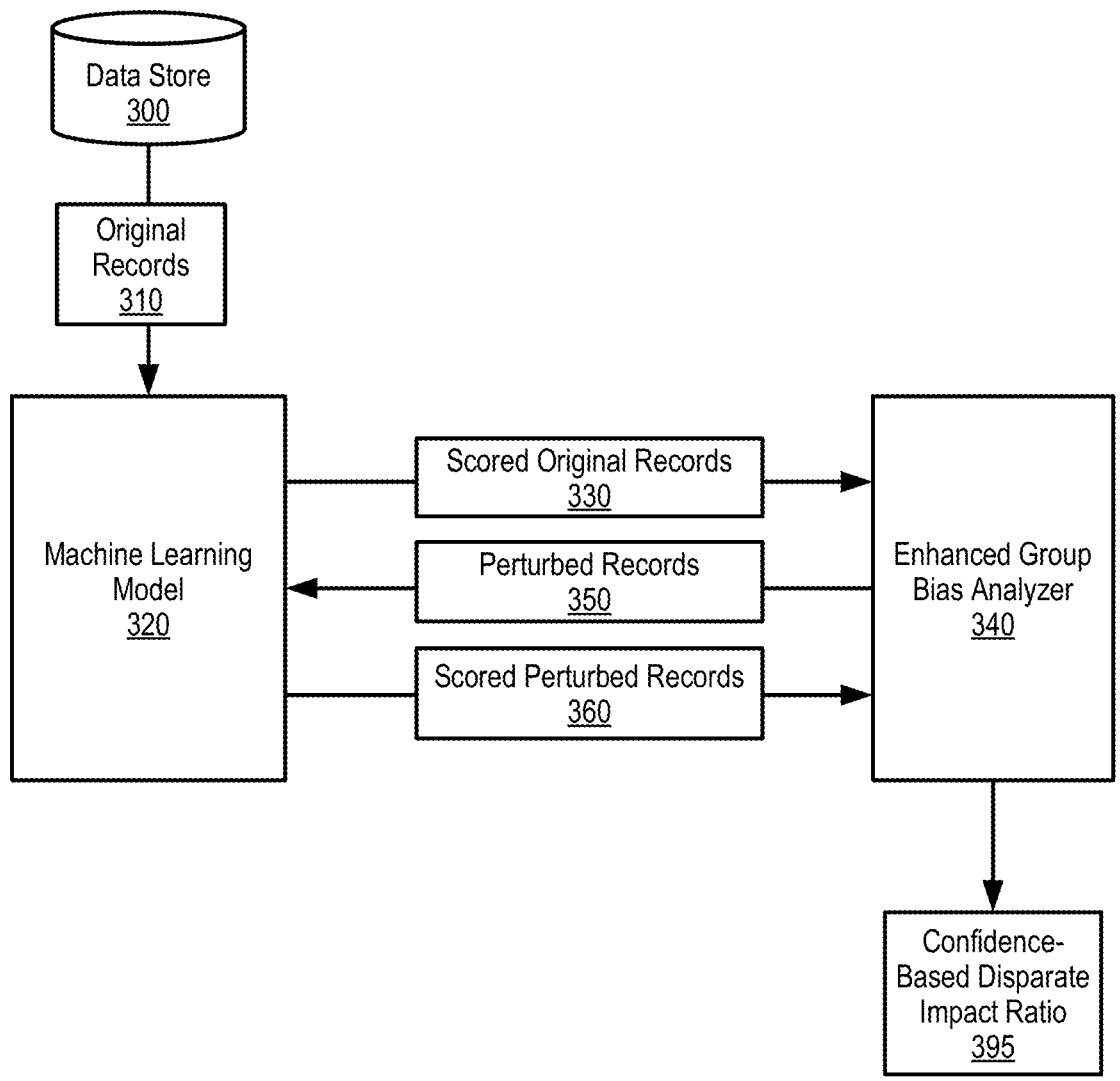
FIG. 3 is an exemplary diagram depicting an enhanced group bias analyzer that evaluates low confidence prediction records and generates a confidence-based desperate impact ratio based on the evaluation.

FIG. 3 is an exemplary diagram depicting an enhanced group bias analyzer that evaluates low confidence prediction records and generates a confidence-based desperate impact ratio based on the evaluation.

Machine learning model 320 receives original records 310 from data store 300. Original records 310 include multiple features for which machine learning model 320 evaluates and scores, which includes a prediction (e.g., favorable, unfavorable) and a confidence value of the prediction. For example, machine learning model 320 may score a record and output a "favorable" prediction with a 65% confidence value to the prediction.

Machine learning model 320 sends scored original records 330 to enhanced group bias analyzer 340. Enhanced group bias analyzer 340 uses a pre-defined confidence threshold (e.g., 50%) to determine which records include confident predictions, requiring no further evaluation, and which records include low confidence predictions and therefore require further evaluation.

Figure 6:
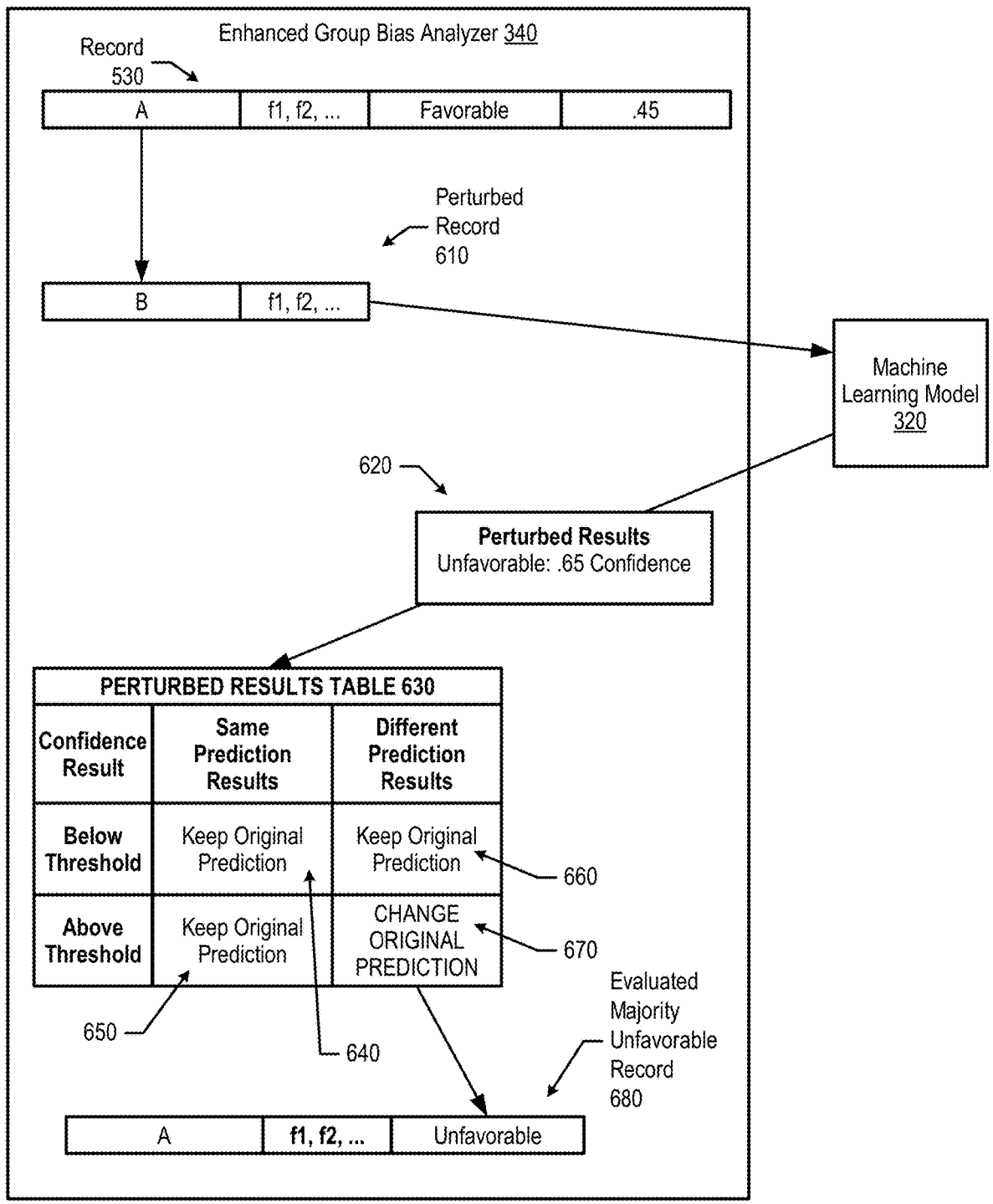
FIG. 6 is an exemplary diagram depicting an enhanced group bias analyzer evaluating a low confidence prediction record.
Figure 7:
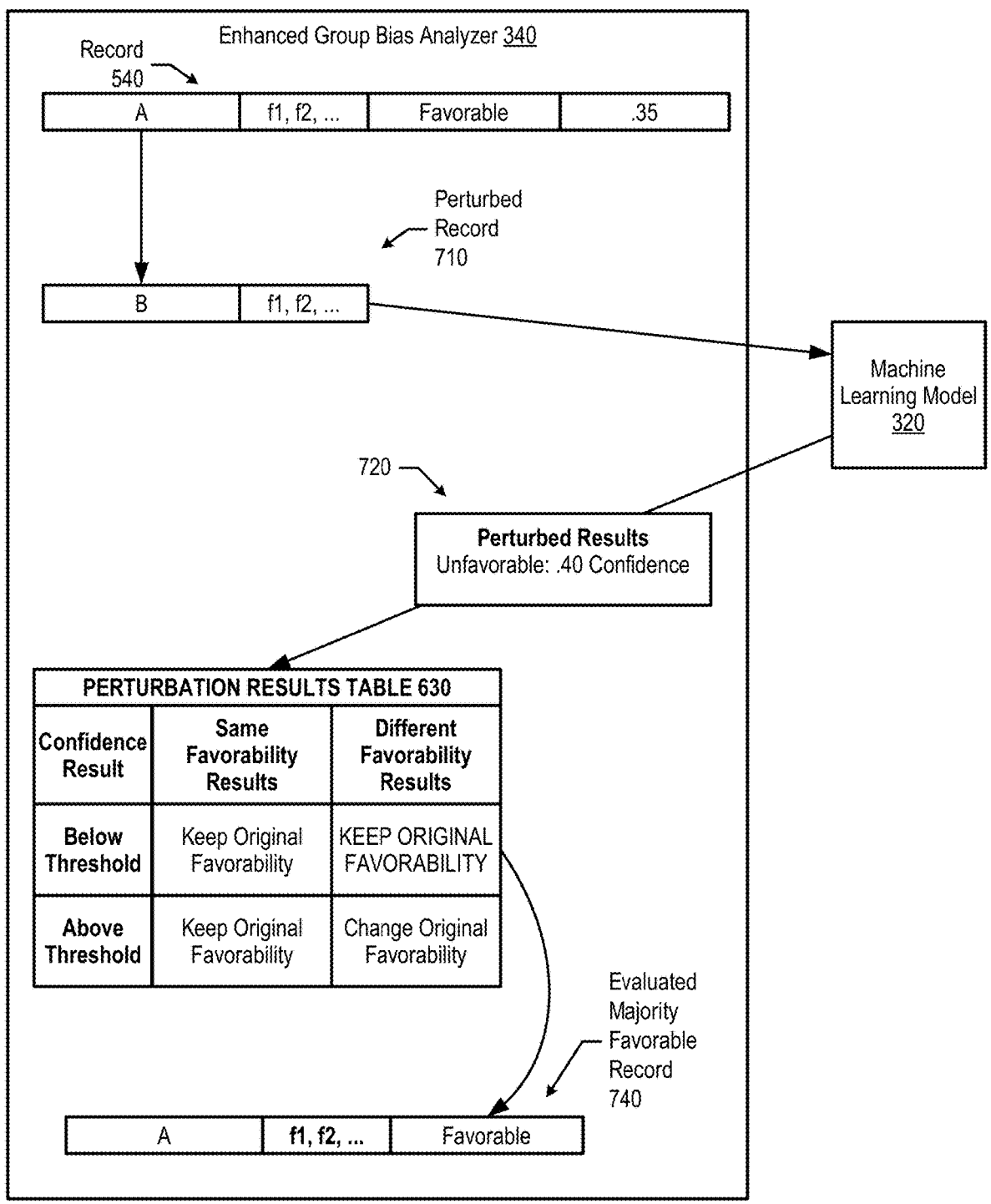
FIG. 7 is an exemplary diagram depicting the enhanced group bias analyzer evaluating another low confidence prediction record.
Figure 10:
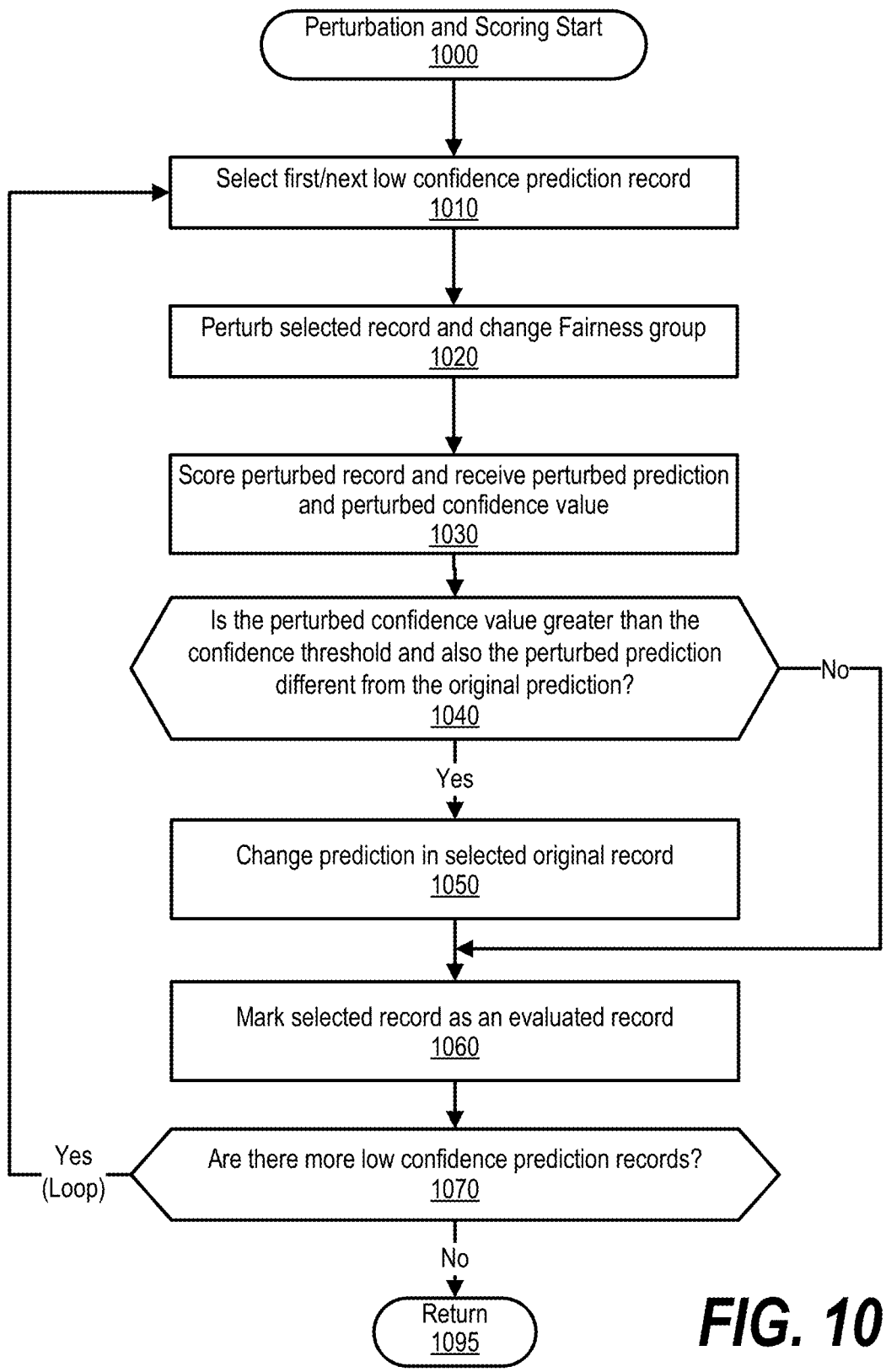
FIG. 10 is an exemplary diagram depicting steps taken in perturbing records and scoring the perturbed records to determine a prediction value.

Enhanced group bias analyzer 340 perturbs the low confidence prediction records, which includes changing each one their corresponding fairness group attributes (see FIGS. 6, 7, 10, and corresponding text for further details). For example, if a low confidence prediction record has a majority A fairness group attribute, enhanced group bias analyzer 340 changes the fairness group attribute to minority B.

Enhanced group bias analyzer 340 then sends perturbed records 350 to machine learning 320 for scoring. Machine learning model 320 scores perturbed records 350 and sends scored perturbed records 360 back to enhanced group bias analyzer 340. Scored perturbed records 360 includes a prediction and a confidence value, referred to herein as perturbed prediction result and perturbed confidence value.

Enhanced group bias analyzer 340 then evaluates each of scored perturbed records 360 against their corresponding one of scored original records 330 to determine whether to change the prediction result in the original record. Enhanced group bias analyzer 340 uses two criteria on whether to change the original prediction result. First, enhanced group bias analyzer 340 requires that the perturbed confidence value is above the confidence threshold. Second, enhanced group bias analyzer 340 requires that the perturbed prediction result is different from the original prediction result. If both of these criteria are true, then enhanced group bias analyzer 340 changes the prediction result of the original record. For example, if a scored original record prediction is Favorable with a 30% confidence, and its corresponding scored perturbed prediction is Unfavorable with a 60% confidence, then enhanced group bias analyzer 340 changes the original prediction result from Favorable to Unfavorable (see FIGS. 6, 7, and corresponding text for further details).

Perturbed records that are evaluated are referred to herein as "evaluated records" regardless of whether their prediction changes. For example, an evaluated majority favorable record is an evaluated majority record that has an original favorable prediction that does not change after evaluation, or a majority unfavorable record whose prediction changes to favorable based on its perturbed record evaluation.

Figure 4:
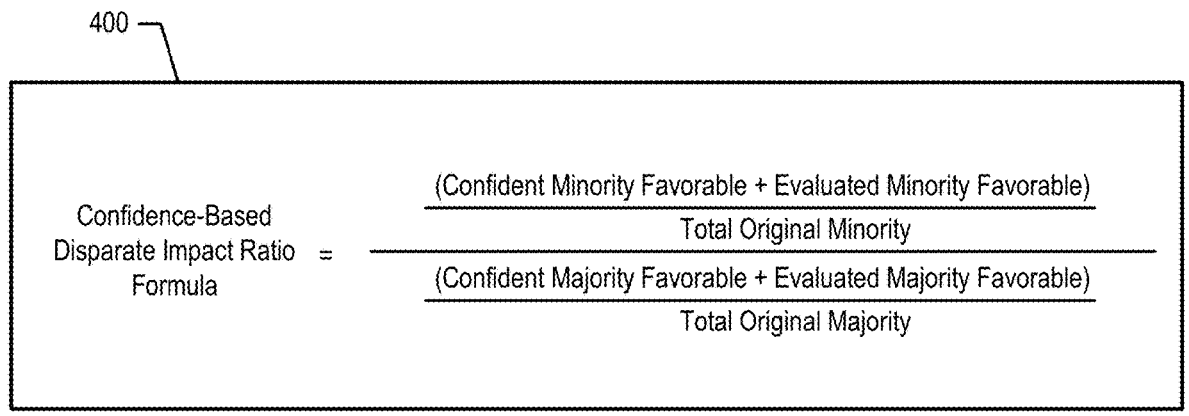
FIG. 4 is an exemplary diagram depicting a formula to compute a confidence-based disparate impact ratio.

Enhanced group bias analyzer 340 then uses the formula shown in FIG. 4 to compute confidence-based disparate impact ratio 395.

FIG. 4 is an exemplary diagram depicting a formula to compute a confidence-based disparate impact ratio. Formula 400 computes confidence-based disparate impact ratio 395 using the following criteria:

Confident Minority Favorable Records: Scored original records that are minority favorable with a confidence value above the confidence threshold;

Evaluated Minority Favorable Records: Perturbed minority records whose outcome is favorable after analysis by enhanced group bias analyzer 340. Evaluated minority favorable records include records that were originally minority favorable that are confirmed minority favorable, as well as minority records that enhanced group bias analyzer 340 changed from unfavorable to favorable based on the perturbation and analysis.

Total Original Minority: The total number of original minority records regardless of their original prediction value or original confidence value.

Confident Majority Favorable: Scored original records that are majority favorable with a confidence value above the confidence threshold;

Evaluated Majority Favorable: Perturbed majority records whose outcome is favorable. These could be records that were originally favorable or records whose prediction changed due to the perturbation and scoring Total Original Majority: The total number of original majority records regardless of their original prediction value or original confidence value.

Prior approaches computed a disparate impact ratio without regard for the confidence value of a scored record. For example, if an original record had the following attributes: Majority, Favorable, 10% confidence, the original record would be counted as a Majority favorable record even though the confidence value of the favorable prediction is low.

In formula 400, the summation of the amount of confident minority favorable records and the evaluated minority favorable records is also referred to herein as "adjusted minority favorable" records. Likewise, the summation of the amount of confident majority favorable records and the evaluated majority favorable records is also referred to herein as "adjusted majority favorable" records.

Figure 9:
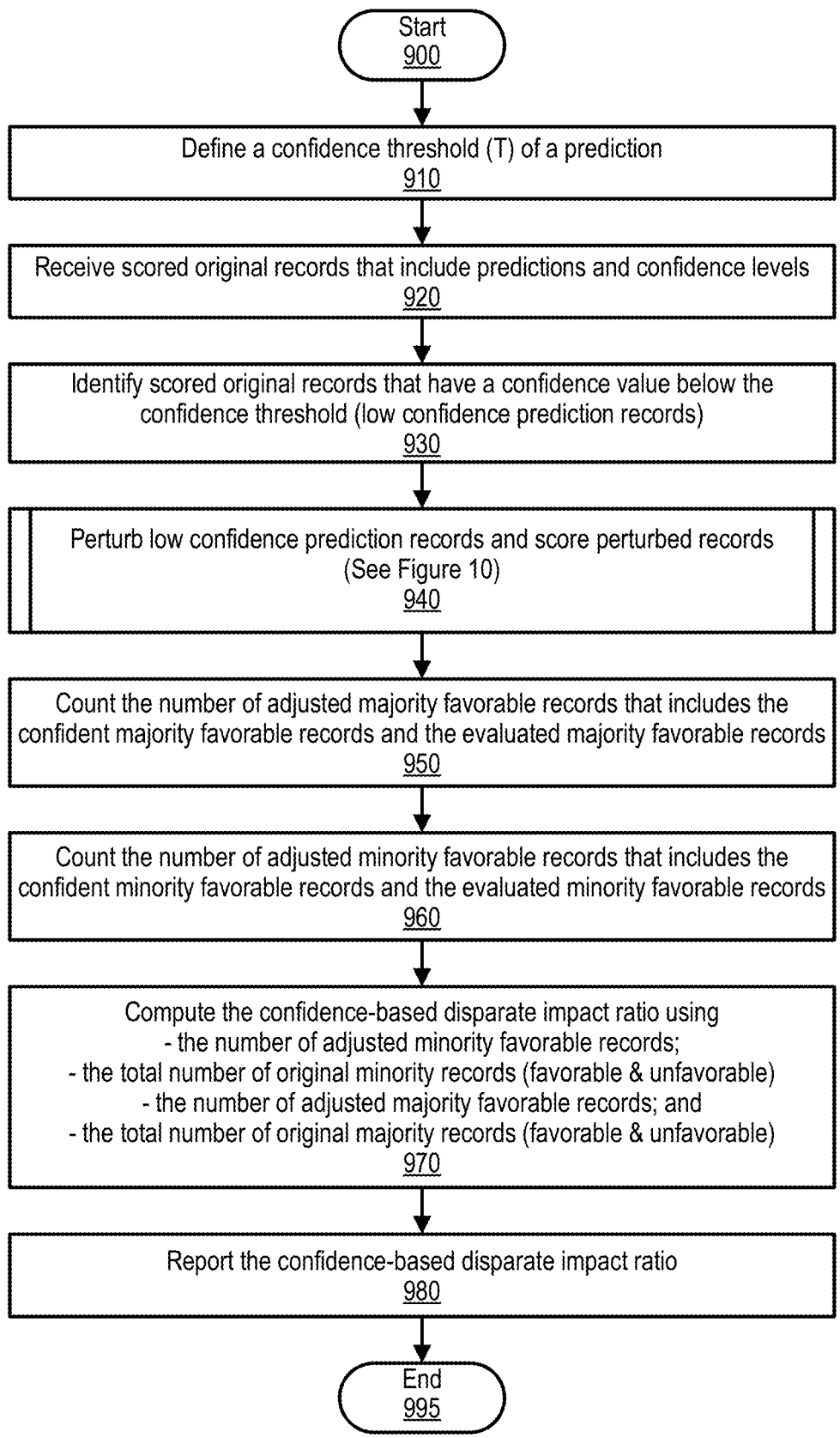
FIG. 9 is an exemplary flowchart depicting steps taken to generate a confidence-based disparate impact ratio.

As discussed herein, enhanced group bias analyzer 340 identifies the low confidence records and performs steps to perturb the low confidence prediction records, score the perturbed records, and determine whether to change predictions in the perturbed records based on their corresponding perturbed scored results (see FIG. 9 and corresponding text for further details).

FIG. 5 is an exemplary diagram depicting a list of scored original records. Scored original records 330 includes records 520 through 575. Each of the records includes a fairness group attribute shown in column 500, other feature values in column 505 from which machine learning model 320 scores, a prediction in column 510, and a confidence value of the prediction in column 515.

Assuming that the confidence threshold is set at 50%, records 520 and 525 have a high enough prediction confidence for no further analysis. Record 520 is considered a confident majority favorable record and record 525 is considered a confident majority unfavorable record. Similarly, records 550 and 555 have a high enough prediction confidence for no further analysis. Record 550 is considered a confident minority favorable record and record 555 is considered a confident minority unfavorable record.

As discussed in detail below, records 530, 535, 548, 545, 560, 565, 570, and 575 have confidence values below the confidence threshold and therefore require further evaluation to determine and validate their prediction outcome (see FIGS. 6 through 10 and corresponding text for further details).

FIG. 6 is an exemplary diagram depicting enhanced group bias analyzer 340 evaluating a low confidence prediction record. Record 530 is a majority favorable record but only has a 45% confidence value. As such, enhanced group bias analyzer 340 perturbs record 530 (changes fairness group attribute A to B) into perturbed record 610 and sends perturbed record 610 to machine learning model 320 for scoring. Machine learning model 320 generates perturbed results 620 that, in this example, include an unfavorable prediction with a 65% confidence.

Perturbed results table 630 shows that enhanced group bias analyzer 340 changes the prediction outcome of a record when its perturbed results have both a different favorability result and also have a confidence value above the confidence threshold. If the perturbed confidence result is below the confidence threshold with the same favorability result, enhanced group bias analyzer 340 does not change the original prediction result (640). If the perturbed confidence result is above the confidence threshold with the same favorability result, enhanced group bias analyzer 340 does not change the original prediction result (650). If the perturbed confidence result is below the confidence threshold with a different favorability result, enhanced group bias analyzer 340 does not change the original prediction result (660). However, if the perturbed confidence result is above the confidence threshold with a different favorability result, enhanced group bias analyzer 340 changes the original prediction result (670).

Because results 620 include a different prediction result of "unfavorable" relative to the "favorable" outcome of record 530, and also because result 620 includes a 65% confidence value (above the confidence threshold), enhanced group bias analyzer 340 changes the prediction result to "unfavorable" as can be seen in evaluated majority unfavorable record 680.

FIG. 7 is an exemplary diagram depicting enhanced group bias analyzer 340 evaluating another low confidence prediction record. Record 540 is a majority favorable record but only has a 35% confidence value. As such, enhanced group bias analyzer 340 perturbs record 540 into perturbed record 710 and sends perturbed record 710 to machine learning model 320 for scoring. Machine learning model 320 generates perturbed results 720 that, in this example, include an unfavorable prediction outcome with a 40% confidence.

Results 720 include a different prediction result of "unfavorable" relative to the "favorable" outcome of record 530, but includes a 40% confidence value (below the confidence threshold). Therefore, enhanced group bias analyzer 340 keeps the prediction result in its original form and marks the record as evaluated majority favorable record 740.

Figure 8:
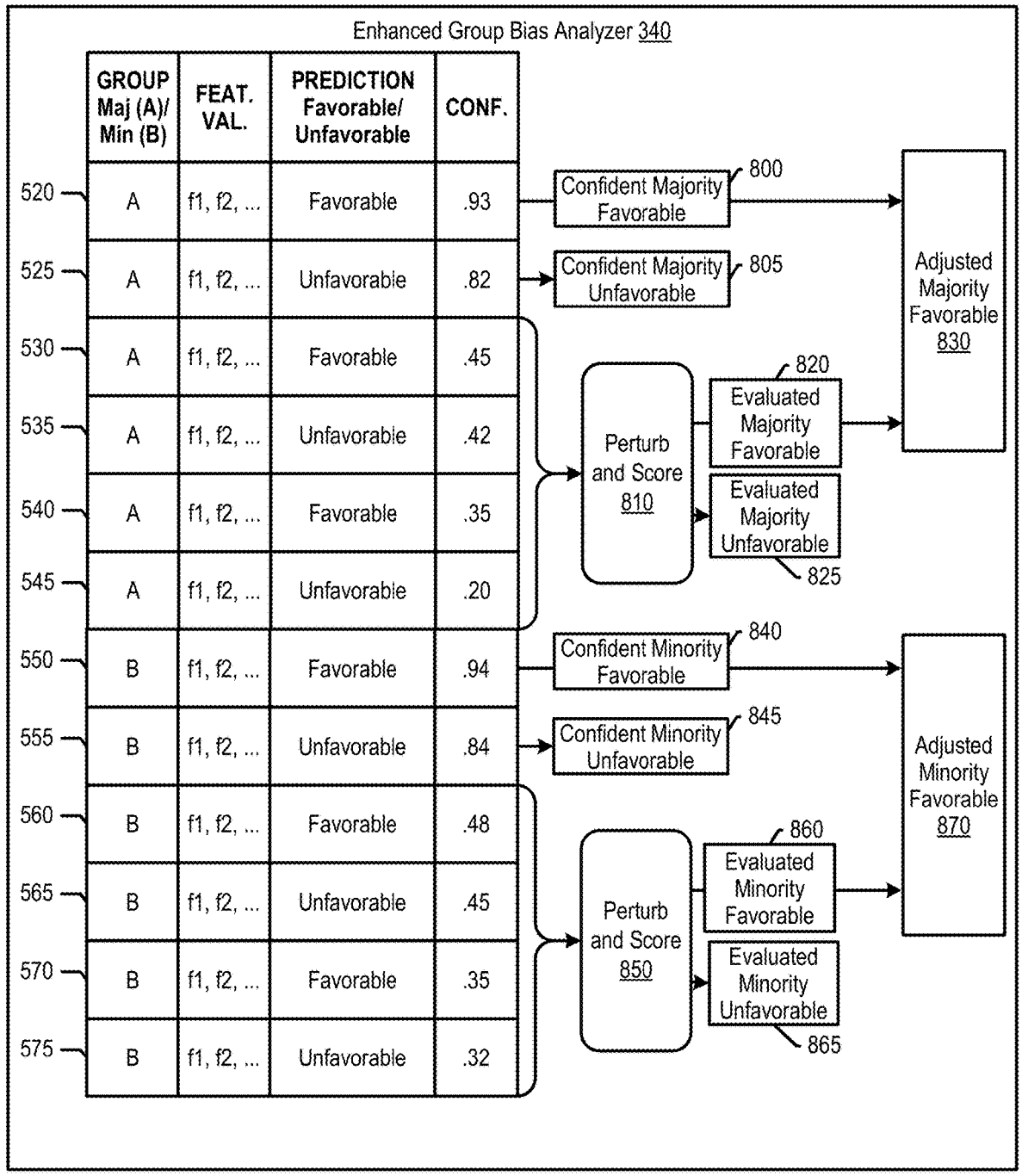
FIG. 8 is a diagram depicting the enhanced group bias analyzer processing multiple records.

FIG. 8 is a diagram depicting enhanced group bias analyzer 340 processing multiple records. Enhanced group bias analyzer 340 evaluates record 520 and determines that record 520 should be marked as a confident majority favorable record (800) because of its fairness group, its prediction outcome, and its confidence value. Likewise, enhanced group bias analyzer 340 evaluates record 525 and determines that record 525 should be marked as a confident majority unfavorable record (805) because of its fairness group, its prediction outcome, and its confidence value.

Records 530 through 545, however, have confidence values below the confidence threshold (assuming T=50%) and therefore require further analysis. Enhanced group bias analyzer 340 performs perturb and score 810 to produce evaluated majority favorable records 820 and evaluated majority unfavorable records 825 (see FIG. 10 and corresponding text for further details). Enhanced group bias analyzer 340 uses confident majority favorable records 800 and evaluated majority favorable records 820 to compute the amount of adjusted majority favorable records 830 that enhanced group bias analyzer 340 uses to compute confidence-based desperate impact ratio 395.

Regarding minority records, enhanced group bias analyzer 340 evaluates record 550 and determines that record 550 should be marked as a confident minority favorable record (840) because of its fairness group, its prediction outcome, and its confidence value. Likewise, enhanced group bias analyzer 340 evaluates record 555 and determines that record 555 should be marked as a confident minority unfavorable record (845) because of its fairness group, its prediction outcome, and its confidence value.

Records 560 through 575, however, have confidence values below the confidence threshold and therefore require further analysis. Enhanced group bias analyzer 340 performs perturb and score 850 to produce evaluated minority favorable records 860 and evaluated minority unfavorable records 865. Enhanced group bias analyzer 340 uses confident minority favorable records 840 and evaluated minority favorable records 860 to compute the amount of adjusted minority favorable records 870 that enhanced group bias analyzer 340 uses to compute the confidence-based desperate impact ratio 395.

FIG. 9 is an exemplary flowchart depicting steps taken to generate a confidence-based disparate impact ratio. FIG. 9 processing commences at 900 whereupon, at step 910, the process defines a confidence threshold (T) of a prediction. The confidence threshold is the threshold at which enhanced group bias analyzer 340 determines the scored original records have a confident prediction result and therefore require no further analysis and the scored original records that require perturbation and further analysis.

At step 920, the process receives scored original records 330 that include predictions and confidence values. At step 930, the process identifies a set of the scored original records that have a confidence value below the confidence threshold (low confidence prediction records) and at predefined process 940, the process perturbs the low confidence prediction records, scores the perturbed results, and changes the record predictions as needed based on the perturbed scored results (see FIG. 10 and corresponding text for processing details).

At step 950, the process counts the number of adjusted majority favorable records, which includes i) the confident majority favorable records from scored original records 330 that are majority favorable and have a confidence value above the confidence threshold, and ii) the evaluated majority favorable records that are identified during the steps shown in FIG. 10.

At step 960, the process counts the number of adjusted minority favorable records, which includes i) the confident minority favorable records from scored original records 330 that are minority favorable and have a confidence value above the confidence threshold, and ii) the evaluated minority favorable records that are identified during the steps shown in FIG. 10

At step 970, the process computes a confidence-based disparate impact ratio as discussed herein using i) the number of adjusted minority favorable records; ii) the total number of original minority records; iii) the number of adjusted majority favorable records; and iv) the total number of original majority records. At step 980, the process reports the confidence-based desperate impact ratio. In one embodiment, the process uses the confidence-based desperate impact ratio has a retraining tool For machine learning model 320. FIG. 9 processing thereafter ends at 995.

FIG. 10 is an exemplary diagram depicting steps taken in perturbing records and scoring the perturbed records to determine a prediction value. The steps shown in FIG. 10 further analyze those scored original records that include a confidence value below the confidence threshold. For example, if the confidence threshold is set at 50%, FIG. 10 further evaluates the scored original records with a confidence value below 50% to determine whether the original record's prediction should change.

FIG. 10 processing commences at 1000 whereupon, at step 1010, the process selects the first low confidence prediction record. At step 1020, the process perturbs selected record and changes the selected record's Fairness group. For example, if the selected record's Fairness group is "group A," then the process changes the selected record's Fairness group to "group B." The process performs this step to determine whether the fairness group value plays a part in the outcome result.

At step 1030, the process scores the perturbed record and receives perturbed prediction and perturbed confidence value (set FIG. 6, 620 and corresponding text for further details). The process determines as to whether i) the perturbed confidence value is greater than the confidence threshold and also ii) whether the perturbed prediction different from the original prediction (decision 1040).

If both the perturbed confidence value is greater than the confidence threshold, and the perturbed prediction is different from the original prediction, then decision 1040 branches to the 'yes' branch (both conditions true). At step 1050, the process changes the prediction in the selected original record, such as from "favorable" to "unfavorable" in FIG. 6. At step 1060, the process marks the selected record as an evaluated record.

On the other hand, if either the perturbed confidence value is not greater than the confidence threshold, or the perturbed prediction is not different from the original prediction, then decision 1040 branches to the 'no' branch bypassing step 1050 and maintaining the original prediction in the selected record, thus indicating that the Fairness group value did not play a part in the outcome. At step 1060, the process marks the selected record as an evaluated record.

The process determines as to whether there are more low confidence prediction records to evaluate (decision 1070). If there are more low confidence prediction records to evaluate, then decision 1070 branches to the 'yes' branch which loops back to select and process the next low confidence prediction record. This looping continues until there are no more low confidence prediction records to evaluate, at which point decision 1070 branches to the 'no' branch exiting the loop. FIG. 10 processing thereafter returns to the calling routine (see FIG. 9) at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method for training a machine learning model comprising:
   receiving a plurality of scored records based on training data associated with the machine learning model, wherein a selected one of the plurality of scored records comprises a first fairness group attribute, a first prediction, and a first confidence value corresponding to the first prediction;
   perturbing the selected scored record to a second fairness group attribute in response to determining that the first confidence value is below a confidence threshold;
   based on the perturbation, generating, for the selected scored record and via the machine learning model, a second prediction and a second confidence value corresponding to the second prediction;
   modifying the selected scored record by changing the first prediction to the second prediction in response to determining that the second prediction is different from the first prediction and that the second confidence value is higher than the confidence threshold;
   computing a confidence-based disparate impact ratio associated with the machine learning model based in part on the plurality of scored records and confidence values associated with the plurality of scored records; and
   retraining the machine learning model based on the computed confidence-based disparate impact ratio.

2. The method of claim 1 further comprising:
   identifying set of confident majority favorable records from the plurality of scored records wherein, for each one of the set of confident majority favorable records, the first fairness group attribute is a majority, the first prediction is favorable, and the first confidence value is above the confidence threshold.

3. The method of claim 2 further comprising:
   combining the modified scored record with the set of confident majority favorable records into a set of adjusted majority favorable records in response to determining that, for the modified scored record, the first fairness group attribute is the majority and the second prediction is favorable.

4. The method of claim 3 further comprising:
   identifying set of confident minority favorable records from the plurality of scored records wherein, for each one of the set of confident minority favorable records, the first fairness group attribute is a minority, the first prediction is favorable, and the first confidence value is above the confidence threshold.

5. The method of claim 4 further comprising:
identifying a different scored record from the plurality of scored records that has a minority fairness group attribute, an unfavorable first prediction, and a different first confidence value;
perturbing the different scored record to the majority fairness group attribute in response to determining that the different first confidence value is below the confidence threshold;
scoring the perturbed different record to generate a favorable prediction and a different second confidence value corresponding to the favorable prediction; and
modifying the different scored record by changing the unfavorable prediction to favorable in response to determining that the different second confidence value is higher than the confidence threshold;
combining the modified different scored record with the set of confident minority favorable records into a set of adjusted minority favorable records; and
computing the confidence-based disparate impact ratio of a machine learning model using the set of adjusted minority favorable records and the set of adjusted majority favorable records.

6. The method of claim 5 wherein, prior to computing the confidence-based disparate impact ratio, the machine learning model scores a plurality of original records to generate the plurality of scored records and also scores the perturbed record.

7. The method of claim 1 further comprising:
maintaining the first prediction in the selected scored record in response to determining that the second confidence value is below the confidence threshold.

8. An information handling system comprising:
one or more processors;
a memory coupled to at least one of the processors;
a set of computer program instructions stored in the memory and executed by at least one of the processors in order to perform actions of:
receiving a plurality of scored records based on training data associated with a machine learning model, wherein a selected one of the plurality of scored records comprises a first fairness group attribute, a first prediction, and a first confidence value corresponding to the first prediction;
perturbing the selected scored record to a second fairness group attribute in response to determining that the first confidence value is below a confidence threshold;
based on the perturbation, generating, for the selected scored record and via the machine learning model, a second prediction and a second confidence value corresponding to the second prediction;
modifying the selected scored record by changing the first prediction to the second prediction in response to determining that the second prediction is different from the first prediction and that the second confidence value is higher than the confidence threshold;
computing a confidence-based disparate impact ratio associated with the machine learning model based in part on the plurality of scored records and confidence values associated with the plurality of scored records; and
retraining the machine learning model based on the computed confidence-based disparate impact ratio.

9. The information handling system of claim 8 wherein the processors perform additional actions comprising:
identifying set of confident majority favorable records from the plurality of scored records wherein, for each one of the set of confident majority favorable records, the first fairness group attribute is a majority, the first prediction is favorable, and the first confidence value is above the confidence threshold.

10. The information handling system of claim 9 wherein the processors perform additional actions comprising:
combining the modified scored record with the set of confident majority favorable records into a set of adjusted majority favorable records in response to determining that, for the modified scored record, the first fairness group attribute is the majority and the second prediction is favorable.

11. The information handling system of claim 10 wherein the processors perform additional actions comprising:
identifying set of confident minority favorable records from the plurality of scored records wherein, for each one of the set of confident minority favorable records, the first fairness group attribute is a minority, the first prediction is favorable, and the first confidence value is above the confidence threshold.

12. The information handling system of claim 11 wherein the processors perform additional actions comprising:
identifying a different scored record from the plurality of scored records that has a minority fairness group attribute, an unfavorable first prediction, and a different first confidence value;
perturbing the different scored record to the majority fairness group attribute in response to determining that the different first confidence value is below the confidence threshold;
scoring the perturbed different record to generate a favorable prediction and a different second confidence value corresponding to the favorable prediction; and
modifying the different scored record by changing the unfavorable prediction to favorable in response to determining that the different second confidence value is higher than the confidence threshold;
combining the modified different scored record with the set of confident minority favorable records into a set of adjusted minority favorable records; and
computing the confidence-based disparate impact ratio of a machine learning model using the set of adjusted minority favorable records and the set of adjusted majority favorable records.

13. The information handling system of claim 12 wherein, prior to computing the confidence-based disparate impact ratio, the machine learning model scores a plurality of original records to generate the plurality of scored records and also scores the perturbed record.

14. The information handling system of claim 8 wherein the processors perform additional actions comprising:
maintaining the first prediction in the selected scored record in response to determining that the second confidence value is below the confidence threshold.

15. A computer program product stored in a computer readable storage medium, comprising computer program code that, when executed by an information handling system, causes the information handling system to perform actions comprising:
receiving a plurality of scored records based on training data associated with a machine learning model, wherein a selected one of the plurality of scored records comprises a first fairness group attribute, a first prediction, and a first confidence value corresponding to the first prediction;

perturbing the selected scored record to a second fairness group attribute in response to determining that the first confidence value is below a confidence threshold;
based on the perturbation, generating, for the selected scored record and via the machine learning model, a second prediction and a second confidence value corresponding to the second prediction;
modifying the selected scored record by changing the first prediction to the second prediction in response to determining that the second prediction is different from the first prediction and that the second confidence value is higher than the confidence threshold;
computing a confidence-based disparate impact ratio associated with the machine learning model based in part on the plurality of scored records and confidence values associated with the plurality of scored records; and
retraining the machine learning model based on the computed confidence-based disparate impact ratio.

16. The computer program product of claim 15 wherein the information handling system performs further actions comprising:
identifying set of confident majority favorable records from the plurality of scored records wherein, for each one of the set of confident majority favorable records, the first fairness group attribute is a majority, the first prediction is favorable, and the first confidence value is above the confidence threshold.

17. The computer program product of claim 16 wherein the information handling system performs further actions comprising:
combining the modified scored record with the set of confident majority favorable records into a set of adjusted majority favorable records in response to determining that, for the modified scored record, the first fairness group attribute is the majority and the second prediction is favorable.

18. The computer program product of claim 17 wherein the information handling system performs further actions comprising:
identifying set of confident minority favorable records from the plurality of scored records wherein, for each one of the set of confident minority favorable records, the first fairness group attribute is a minority, the first prediction is favorable, and the first confidence value is above the confidence threshold.

19. The computer program product of claim 18 wherein the information handling system performs further actions comprising:
identifying a different scored record from the plurality of scored records that has a minority fairness group attribute, an unfavorable first prediction, and a different first confidence value;
perturbing the different scored record to the majority fairness group attribute in response to determining that the different first confidence value is below the confidence threshold;
scoring the perturbed different record to generate a favorable prediction and a different second confidence value corresponding to the favorable prediction; and
modifying the different scored record by changing the unfavorable prediction to favorable in response to determining that the different second confidence value is higher than the confidence threshold;
combining the modified different scored record with the set of confident minority favorable records into a set of adjusted minority favorable records; and
computing the confidence-based disparate impact ratio of a machine learning model using the set of adjusted minority favorable records and the set of adjusted majority favorable records, wherein, prior to computing the confidence-based disparate impact ratio, the machine learning model scores a plurality of original records to generate the plurality of scored records and also scores the perturbed record.

20. The computer program product of claim 15 wherein the information handling system performs further actions comprising:
maintaining the first prediction in the selected scored record in response to determining that the second confidence value is below the confidence threshold.

* * * * *